United States Patent [19]

Appling

[11] Patent Number: 4,600,222
[45] Date of Patent: Jul. 15, 1986

[54] APPARATUS AND METHOD FOR COUPLING POLYMER CONDUITS TO METALLIC BODIES

[75] Inventor: Donald F. Appling, Lindsay, Calif.

[73] Assignee: Waterman Industries, Exeter, Calif.

[21] Appl. No.: 701,307

[22] Filed: Feb. 13, 1985

[51] Int. Cl.$^4$ .............................................. F16L 41/00
[52] U.S. Cl. ..................................... 285/158; 29/453; 403/261; 403/383; 156/293; 156/294; 285/330; 285/373; 285/915; 285/921
[58] Field of Search ............... 285/158, 239, DIG. 16, 285/DIG. 22, 330, 373, 419; 156/293, 294; 29/453; 403/261, 383

[56] References Cited

U.S. PATENT DOCUMENTS

| | | |
|---|---|---|
| 2,398,788 | 4/1946 | Hedrick ...................... 285/DIG. 16 |
| 3,163,450 | 12/1964 | Eirhart, Jr. . |
| 3,701,552 | 11/1972 | Cowan ........................... 285/158 |
| 3,807,776 | 4/1974 | Bingham . |
| 3,826,521 | 7/1974 | Wilhelmsen ..................... 156/294 |
| 4,042,262 | 8/1977 | Mooney et al. .................. 285/330 |
| 4,126,338 | 11/1978 | Coel et al. ....................... 285/330 |
| 4,128,264 | 12/1978 | Oldford . |
| 4,351,550 | 9/1982 | Anderson et al. ................ 285/158 |
| 4,417,753 | 11/1983 | Bacehowski et al. ............. 156/293 |

Primary Examiner—Cornelius J. Husar
Assistant Examiner—Douglas W. Hanson
Attorney, Agent, or Firm—Limbach, Limbach & Sutton

[57] ABSTRACT

A polymer socket is secured to a metallic conduit by snapping a split polymer sleeve around the conduit with a flange on the sleeve engaged within a groove in the conduit, and then securing the sleeve against spreading. The securing function is provided by an annular insert bonded within the sleeve. A throughbore within the sleeve provides the socket.

13 Claims, 3 Drawing Figures

APPARATUS AND METHOD FOR COUPLING POLYMER CONDUITS TO METALLIC BODIES

BACKGROUND OF THE INVENTION

The present invention relates to the connection of polymer conduits to metallic bodies and, more particularly, is directed to an approved apparatus and method for providing such connection, without employing screw threads.

The most common technique for connecting a metallic body to a polymer conduit is to secure the body and conduit together through means of mating screw threads. While very effective, this technique has the disadvantage that it requires the formation of precise mating screw threads. It also has the disadvantage that it requires that the mating elements be twisted relative to one another to effect the connection.

The prior art also teaches the concept of providing some type of external or internal snap connection for securing polymer conduits to metallic fittings. Examples of such connections may be seen in U.S. Pat. Nos. 3,163,450 and 4,128,264. These connections rely upon the resilience of at least one of the elements embodied therein and, necessarily, are dependent upon the resiliency to preserve their integrity.

Another type of connection between polymer conduits and metallic elements may be seen in U.S. Pat. No. 3,807,776. This connection relies upon a friction fit and is dependent upon friction for its integrity.

SUMMARY OF THE INVENTION

The coupling of the present invention is provided by forming a groove adjacent the end of the metallic member to be coupled and engaging a flange on a split polymer sleeve within this groove to secure the sleeve to the metallic member. The sleeve is maintained in such engagement by bonding an annular polymer insert within the sleeve to secure the sleeve against spreading. The interior of the insert provides a socket into which a polymer pipe may be inserted and bonded by conventional means.

A principal object of the invention is to provide an improved coupling for securing a metallic body to a polymer conduit, without the necessity of employing screw threads.

Another object of the invention is to provide such a coupling which may be inexpensively fabricated and installed by relatively unskilled workmen.

Another and more general object of the invention is to provide such a coupling which is ideally suited for use with large valve bodies and conduits.

Yet another object of the invention is to provide such a coupling which may secure a conduit against rotation relative to the valve body.

Still another object of the invention is to provide such a coupling which provides a strong fluid tight connection.

These and other objects will become more apparent when viewed in light of the following detailed description and accompanying drawings.

DESCRIPTION OF THE PREFERRED EMBODIMENT

Figure 1:
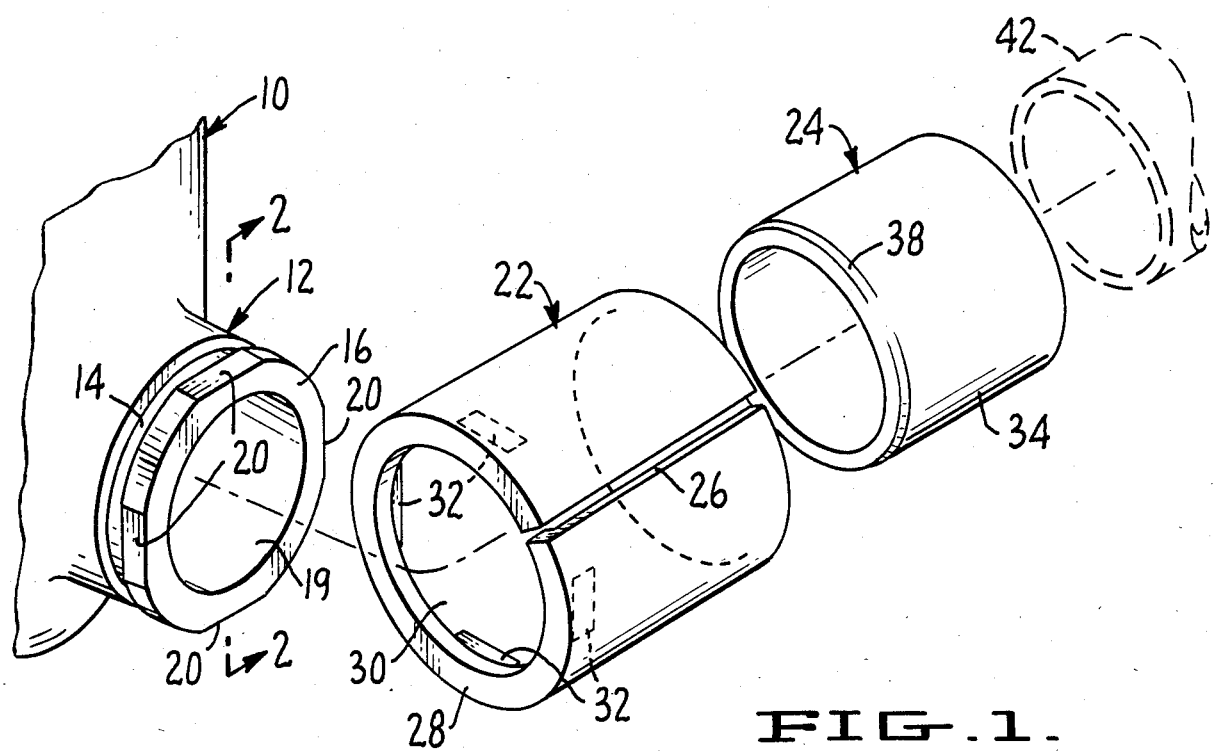
FIG. 1 is an exploded perspective view illustrating the coupling and a metallic valve body.

Referring to FIG. 1, the metallic valve body is designated therein in its entirety by the numeral 10 and is shown as having a collar 12 formed integrally therewith to provide a metallic conduit opening into the valve body. An annular groove 14 is formed in the collar adjacent and in closely spaced relationship to the end of the collar, designated 16. As may be seen from FIG. 2, the groove 14 provides a shoulder 18.

The collar 12 is of generally cylindrical external configuration and defines a conduit passage 19 of similar configuration. That portion of the collar 12 disposed between the groove 14 and the open distal end 16 is formed with a plurality of flats 20 disposed around the circumference of the collar at approximately 90 degree intervals. These flats, as will become more apparent subsequently, serve as anti-rotation means for the polymer portion of the coupling.

The polymer components of the coupling comprise a split sleeve 22 and an annular insert 24. These may be fabricated from any suitable polymer material, such as polyvinylchloride (PVC). The sleeve 22 is split longitudinally so that it may be expanded and snapped over the collar 12. The split, designated 26, may be seen in FIG. 1. An inwardly directed flange 28 is formed on one end of the sleeve and proportioned for receipt within the groove 14 and abutting engagement with the shoulder 18. Such receipt of the flange within the groove is facilitated by resiliently spreading the split 26 to enable the flange to pass over the distal end of the collar 12 and then snap into the groove.

The sleeve 22 is formed with a cylindrical internal surface 30, which surface is provided with inwardly directed flats 32 adjacent the flange 28. The flats 32 are positioned and proportioned to complementally engage the flats 20 when the sleeve is received around the collar 12. Such engagement serves to lock the sleeve against rotation relative to the collar.

Figure 2:
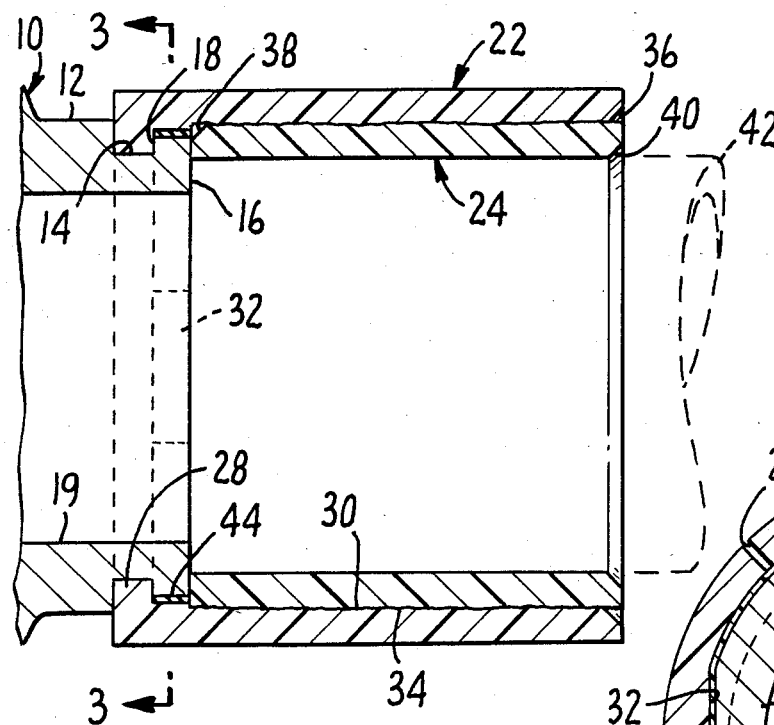
FIG. 2 is a cross-sectional view taken on the plane designated by line 2—2 of FIG. 1, illustrating the coupling engaged with the metallic valve body.
Figure 3:
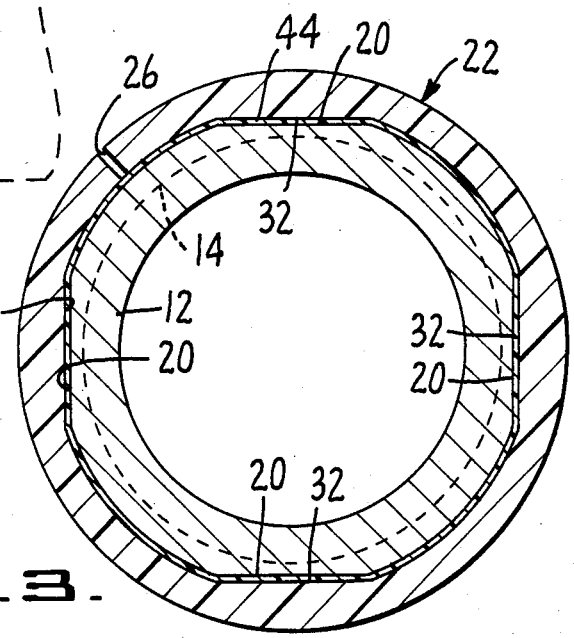
FIG. 3 is a cross-sectional view taken on the plane designated by line 3—3 of FIG. 2.

The insert 24 is proportioned for snug complemental receipt within the sleeve 22. The engaged condition may best be seen from FIG. 2. It should be appreciated that although that figure illustrates the interface between the collar 12 and sleeve 22 as being irregular, in fact the insert 24 is formed with a smooth cylindrical outer surface 34 which is perfectly complemental with the internal surface 30 of the sleeve. The irregular interface shown in FIG. 2 depicts the condition which occurs as the result of solvent bonding of the surfaces 30 and 34.

Engagement of the insert 24 within the sleeve 22 is facilitated by a chamfered edge 36 formed on the trailing end of the sleeve 22 and a chamfered edge 38 formed on the leading end of the insert 24. A chamferred edge 40 formed on the internal trailing end of the insert 24 facilitiates insertion of a conduit into the socket provided by the insert. Such a conduit is illustrated in the drawings in phantom lines and designated by the number 42.

In practice, the components are initially in the condition shown in FIG. 1. This means that the end of the collar or other metallic element to which connection is to be made has been preformed to provide the groove 14 and the flats 20. To assure a fluid tight connection through the coupling, a gasket 44 is positioned so as to be interposed between the outer peripheral surface of the collar 12 and the inner peripheral surface of the sleeve 22. The gasket may be formed of any suitable material, such as latex or silicone, and may be either preformed, or formed in place.

In assembling the coupling, the sleeve 22 is first resiliently spread to enable it to pass over the end of the collar 12 to a position wherein the flange 28 is in apposition to the groove 14. The spreading force on the sleeve is then relaxed to permit the flange to engage within the groove. If necessary, the sleeve may then be turned relative to the collar to align the flats 20 and 32. The internal surface 30 of the sleeve and the external surface 34 of the insert are then coated with a suitable bonding solvent and then the insert is forced into the sleeve to the position shown in FIG. 2 wherein the leading end of the insert abuts against the open distal end 16 of the collar 12. At this point, an external clamping force is applied to the sleeve to contract the split 26 and force the sleeve into snug engagement with the insert. This force is maintained for a sufficient period to permit the bond between the internal surface of the sleeve and the external surface of the insert to cure.

With the sleeve and insert so secured in place, the internal surface of the insert provides a socket into which a polymer pipe may be inserted and bonded in conventional fashion. For this purpose, the internal diameter of the insert is chosen so as to be complemental with the external diameter of the conduit to be secured to it. Bonding of the conduit would be achieved by coating the internal surface of the insert and the external surface of the conduit with a suitable solvent adhesive and then forcing the conduit into the insert. Ideally, the conduit would be pushed fully through the insert and into engagement with the distal end 16 of the collar 12.

Conclusion

While a preferred embodiment has been illustrated and described, it should be appreciated that the invention is not intended to be limited to the specifics of this embodiment, but rather is defined by the accompanying claims. For example, although the illustrated embodiment shows the metallic conduit as being a collar formed on a metallic valve body, it should be appreciated that a connection might be made to other types of metallic conduits.

I claim:

1. A coupling for securing a polymer pipe in communication with a passage in a metal body, said coupling comprising: a collar secured to the body and opening into the passage, said collar having an external annular groove extending therearound; a split polymer sleeve received around the collar, said sleeve having an inwardly directed flange engaged with the annular groove of the collar; and an annular insert disposed within the sleeve, said insert being complementally engaged with the sleeve and bonded thereto.

2. A coupling according to claim 1 wherein the collar is integral with the metal body.

3. A coupling according to claim 2 wherein the collar and sleeve are provided with complementally engageable anti-rotation means to prevent rotation of the sleeve relative to the collar.

4. A coupling according to claim 3 wherein the collar and sleeve are generally cylindrical and the anti-rotation means comprise complemental flats formed thereon.

5. A coupling according to claim 1 further comprising a gasket between the collar and sleeve to provide a fluid tight seal therebetween.

6. A method of coupling the open end of a metallic conduit in fluid communication with a polymer conduit, said method comprising: forming an annular groove around the metallic conduit in closely spaced relationship to the open end thereof; providing a split polymer sleeve proportioned for complemental engagement around the open end of the metallic conduit, said sleeve having an inwardly directed flange engageable with the groove formed in the metallic conduit upon complemental engagement of the sleeve around the metallic conduit; spreading the sleeve and passing it over the metallic conduit to a condition wherein the flange is in apposition to the groove; contracting the sleeve to a condition wherein the flange is engaged within the groove; securing the sleeve in the contracted condition by bonding an annular insert within the sleeve, said insert having a throughbore proportioned for complemental receipt of the polymer conduit; and bonding the polymer conduit within the throughbore of the insert.

7. A method according to claim 6 further comprising the step of providing a gasket between the sleeve and the metallic conduit to provide a fluid tight seal therebetween upon engagement of the flange within the groove.

8. A method according to claim 6 wherein the insert is secured within the sleeve so as to abut the open end of the metallic conduit.

9. A method of securing a polymer socket to the open end of a metallic conduit, said method comprising: providing a shoulder on the conduit adjacent the open end thereof; providing a split polymer sleeve proportioned for complemental engagement around the open end of the conduit, said sleeve having an inwardly directed flange engageable with the shoulder on the conduit; spreading the sleeve and passing it over the metallic conduit to a condition wherein the flange is positioned for engagement with the shoulder upon contraction of the sleeve; contracting the sleeve to a condition wherein the flange is engaged with the sleeve; and securing the sleeve in the contracted condition.

10. A method according to claim 8 wherein the sleeve is secured in the contracted condition by bonding an annular insert within the sleeve.

11. A coupling for securing a polymer conduit to the open end of a metallic conduit, said coupling comprising: a shoulder fixed relative to the metallic conduit adjacent the open end thereof; a split polymer sleeve received around the metallic conduit, said sleeve having inwardly directed flange means engaged with the shoulder to prevent separation of the sleeve from the conduit; an annular polymer insert disposed within the sleeve, said insert being complementally engaged with the sleeve and bonded thereto to hold the flange means in engagement with the shoulder.

12. A coupling according to claim 11 wherein the insert abuts the open end of the metallic conduit.

13. A coupling according to claim 12 further comprising a gasket disposed between the sleeve and the metallic conduit to provide a fluid tight seal therebetween.

* * * * *